(12) United States Patent
Kelly

(10) Patent No.: US 6,594,254 B1
(45) Date of Patent: *Jul. 15, 2003

(54) DOMAIN NAME SERVER ARCHITECTURE FOR TRANSLATING TELEPHONE NUMBER DOMAIN NAMES INTO NETWORK PROTOCOL ADDRESSES

(75) Inventor: Keith C. Kelly, Deerfield Beach, FL (US)

(73) Assignee: Netspeak Corporation, Newark, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/911,519

(22) Filed: Aug. 14, 1997

Related U.S. Application Data

(60) Provisional application No. 60/023,891, filed on Aug. 16, 1996.

(51) Int. Cl.$^7$ .............................................. H04L 12/66
(52) U.S. Cl. ........................ 370/352; 370/389; 370/401
(58) Field of Search ................................ 370/352, 354, 370/356, 389, 392, 475, 237, 401, 230; 379/88.17, 201, 210, 219, 220, 224; 709/200, 201, 203, 218, 219, 227, 202, 230; 455/415, 461; 340/5.8

(56) References Cited

U.S. PATENT DOCUMENTS

| | | | | |
|---|---|---|---|---|
| 5,608,786 A | * | 3/1997 | Gordon | 370/352 |
| 5,742,668 A | * | 4/1998 | Pepe et al. | 455/415 |
| 5,742,762 A | * | 4/1998 | Scholl et al. | 709/200 |
| 5,742,905 A | * | 4/1998 | Pepe et al. | 455/461 |
| 5,799,063 A | * | 8/1998 | Krane | 379/88.17 |
| 6,014,379 A | * | 1/2000 | White et al. | 370/389 |
| 6,021,126 A | * | 2/2000 | White et al. | 370/352 |
| 6,069,890 A | * | 5/2000 | White et al. | 370/352 |
| 6,122,255 A | * | 9/2000 | Bartholomew et al. | 370/237 |
| 6,154,445 A | * | 11/2000 | Farris et al. | 370/237 |
| 6,226,678 B1 | * | 5/2001 | Mattaway et al. | 709/230 |
| 6,300,863 B1 | * | 10/2001 | Cotichini et al. | 340/5.8 |
| 6,347,085 B2 | * | 2/2002 | Kelly | 370/352 |

OTHER PUBLICATIONS

C. Yang, "INETPhone: Telephone Services and Servers on Internet", Network Working Group RFC: 1789, pp. 1–6, Apr. 1995.*

" The History of TPC.INT, " http://www.tpc.int/faq/history.html.

C. Malamud & M. Rose, " Principles of Operation for the TPC.INT Subdomain: Remote Printing –Technical Procedures," Network Working Group, Request for Comments: 1528 (Oct. 1993).

C. Malamud & M. Rose, " Principles of Operation for the TPC.INT Subdomain: Remote Printing –Administrative Policies," Network Working Group, Request for Comments: 1529 (Oct. 1993).

C. Malamud & M. Rose, " Principles of Operation for the TPC.INT Subdomain: General Principles and Policy," Network Working Group, Request for Comments: 1530 (Oct. 1993).

* cited by examiner

Primary Examiner—Hassan Kizou
Assistant Examiner—John Pezzlo
(74) Attorney, Agent, or Firm—Kenyon & Kenyon

(57) ABSTRACT

A method and apparatus for translating a domain name representing a telephone number into a network protocol address includes a domain name server architecture containing logic responsive to a telephone number domain name, the telephone number domain name representing the country code, area code, exchange, or subscriber number of a subscriber apparatus telephone number. The logic resolves the telephone number domain name into a network protocol address usable in ultimately initiating a communication with the subscriber apparatus on a circuit-switched network. In one embodiment, a hierarchical tree of domain names and subdomain names representing the country codes, area codes and exchange codes of telephone numbers is constructed to assist in the process of resolving domain names to network protocol addresses.

23 Claims, 7 Drawing Sheets

| SUBDOMAIN | NETWORK ADDRESS |
|---|---|
| 1 | XXX. XXX. XXX. XXX |
| 45 | |
| 49 | |

*Figure 5A*

| SUBDOMAIN | NETWORK ADDRESS |
|---|---|
| 305 | XXX. XXX. XXX. XXX |
| 954 | |
| 516 | |
| 407 | |
| 904 | |

*Figure 5B*

| SUBDOMAIN | NETWORK ADDRESS |
|---|---|
| 241 | XXX. XXX. XXX. XXX |
| 368 | |
| 392 | |
| 394 | |
| 395 | |
| 750 | |
| 995 | |
| 997 | |
| 998 | |

DOMAIN NAME SERVER ARCHITECTURE FOR TRANSLATING TELEPHONE NUMBER DOMAIN NAMES INTO NETWORK PROTOCOL ADDRESSES

RELATED APPLICATIONS

This application claims priority to U.S. Provisional Patent Application No. 60/023,891 entitled Apparatus For Placing Internet/Intranet Calls by Keith C. Kelly, filed Aug. 16, 1996.

This application is the one of two U.S. patent applications filed on an even date herewith and commonly assigned, including Ser. No. 08/911,133, by Keith C. Kelly, entitled Method and Apparatus for Establishing Communications Between Packet-Switched and Circuit-Switched Networks, the subject matter of which, by this reference, is incorporated herein.

In addition, the subject matters of the following related applications are incorporated herein by reference:

U.S. patent application Ser. No. 08/533,115 entitled Point-to-Point Internet Protocol, by Glenn W. Hutton, filed Sep. 25, 1995;

U.S. patent application Ser. No. 08/719,894, entitled Directory Server For Providing Dynamically Assigned Network Protocol Addresses, by Mattaway filed Sep. 25, 1996;

U.S. patent application Ser. No. 08/721,316, entitled Graphic User Interface For Internet Telephony Application, by Mattaway et al., filed Sep. 25, 1996;

U.S. patent application Ser. No. 08/719,891, entitled Method And Apparatus For Distribution And Presentation Of Multimedia Data Over A Computer Network, by Mattaway et al., filed Sep. 25, 1996;

U.S. patent application Ser. No. 08/719,554, entitled Point-to-point Computer Network Communication Utility Utilizing Dynamically Assigned Network Protocol Addresses, by Mattaway et al., filed Sep. 25, 1996;

U.S. patent application Ser. No. 08/719,640, entitled Method And Apparatus For Dynamically Defining Data Communication Utilities, by Mattaway et al., filed Sep. 25, 1996;

U.S. patent application Ser. No. 08/719,898, entitled Method And Apparatus For Providing Caller Identification Based Out-going Messages In A Computer Telephony Environment, by Mattaway et al., filed Sep. 25, 1996;

U.S. patent application Ser. No. 08/718,911, entitled Method And Apparatus For Providing Caller Identification Based Call Blocking In A Computer Telephony Environment, by Mattaway et al., filed Sep. 25, 1996;

U.S. patent application Ser. No. 08/719,639, entitled Method And Apparatus For Providing Caller Identification Responses In A Computer Telephony Environment, by Mattaway et al., filed Sep. 25, 1996; and U.S. patent application Ser. No. 08/832,746, entitled Virtual Circuit Switching Architecture, by Mattaway et al., filed Apr. 4, 1997;

FIELD OF THE INVENTION

The invention relates, generally, to data processing systems and telecommunication systems, and, more specifically, to a technique for enabling communication connections between circuit-switched communication networks and packet-switched data processing networks.

BACKGROUND OF THE INVENTION

Two fundamentally different switching technologies exist that enable digital communications. The first type, circuit-switched networks, operate by establishing a dedicated connection or circuit between two points, similar to public switched telephone networks( PSTN). A telephone call causes a circuit to be established from the originating phone through the local switching office across trunk lines, to a remote switching office and finally to the intended destination telephone. While such circuit is in place, the call is guaranteed a data path for digitized or analog voice signals regardless of other network activity. The second type packet-switched networks, typically connect computers and establish an asynchronous "virtual" channel between two points. In a packet-switched network, data, such as a voice signal, is divided into small pieces called packets which are then multiplexed onto high capacity connections for transmission. Network hardware delivers packets to specific destinations where the packets are reassembled into the original data set. With packet-switched networks, multiple communications among different computers can proceed concurrently with the network connections shared by different pairs of computers concurrently communicating. Packet-switched networks are, however, sensitive to network capacity. If the network becomes overloaded, there is no guarantee that data will be timely delivered. Despite this drawback, packet-switched networks have become quite popular, particularly as part of the Internet and Intranets, due to their cost effectiveness and performance.

In a packet-switched data network one or more common network protocols hide the technological differences between individual portions of the network, making interconnection between portions of the network independent of the underlying hardware and/or software. A popular network protocol, the Transmission Control Protocol/Internet Protocol (TCP/IP) is utilized by the Internet and Intranets>Intranets are private networks such as Local Area Networks (LANs) and Wide Area Networks (WAN). The TCP/IP protocol utilizes universal addressing as well as a software protocol to map the universal addresses into low level machine addresses. For purposes of this discussion, networks which adhere to the TCP/IP protocol will be referred to hereinafter "IP-based" or as utilizing "IP addresses" or "Internet Protocol address".

It is desirable for communications originating from an IP-based network to terminate at equipment in a PSTN network, and vice versa, or for calls which originate and terminate on a PSTN network to utilize a packet-switched data network as an interim communication medium. Problems arise, however, when a user on an IP-based or other packet switched data network tries to establish a communication link beyond the perimeter of the network, due to the disparity in addressing techniques among other differences used by the two types of networks.

The exchange/subscriber addressing scheme utilized by public switched telephone networks is closely related to the actual physical architecture of the network and therefore to the geographic location of terminating apparatus, i.e. telephone withthin the network. For example, in the United States, a telephone number may be partitioned into a three-digit area code, a three-digit exchange, and a four-digit subscriber number within the exchange. PSTN carriers currently have large, well-established networks with multitudes of subscribers utilizing such naming systems and are set up to interact with other PSTN carrier networks and to account for the variances in local geographic dialing patterns.

Conversely, packet-switched data networks adhere to a network protocol such as the TCP/IP protocol utilizes a hierarchical naming system which is neither based on the underlying hardware of the network nor the geographic locus of the various hardware components. Instead, the TCP/IP protocol partitions computers along lines of authority irrespective of physical location. In TCP/IP, hierarchical machine names are assigned according to structures of organization for parts of name space, not necessarily according to the structure of a physical network interconnection. The TCP/IP protocol implements a naming hierarchy called the Domain Name System (DNS). The Domain Name System utilizes a hierarchical naming scheme referred to as domain names. Domain names consist of a sequence of subdomain names, separated by a delimiter character, i.e. ".". The subdomain names of a domain name are sometimes referred to as labels. For example, the domain name "www.netspeak.com" contains three labels: "www", "netspeak", and "com". Any suffix of a label in a domain name is called a domain. In the above example, the top-level domain is "com." The domain name system is well documented in various public specifications and will not be described hereinafter for the sake of brevity.

The reader will appreciate that due to the naming schemes utilized by PSTN networks and TCP/IP based networks, such as the Internet establishment of direct connections from the Internet to public switched telephone network subscribers and vice versa, is impractical.

In light of the above, a need currently exists for a mechanism which enables translation of a conventional telephone number from a client task on an IP-based network into a network protocol address representing a gateway capable of contacting the subscriber apparatus associated with the telephone number.

A need further exists for a mechanism which accounts for the dilemma of geographic dialing patterns and the nongeographic nature of IP-based networks such as the Internet, versus the hardwired, geographic nature of public switched telephone networks.

A need further exists for a mechanism which facilitates communication between packet-switched networks and circuit-switched networks and which accommodate the existing infrastructure of circuit-switched networks, including inoperability among carriers, subscriber volumes and billing logistics.

SUMMARY OF THE INVENTION

The invention describes a method and apparatus which enables traditional telephone numbers formatted as domain names to be resolved into network protocol addresses, either by a single domain name server apparatus or multiple domain name server apparatus.

According to a first aspect of the present invention, a method for resolving data representing a telephone number comprises the steps of receiving a telephone number domain name identifying a telephone from a source, resolving the telephone number domain name into a network protocol address, and supplying a network protocol address to the source. In one embodiment, a portion of the telephone number domain name represents the country code, area code, exchange, or data segments of a telephone number. In an alternative embodiment, the method entails resolving country code, area code or exchange subdomain names into the network protocol addresses of their respective domain name servers.

In accordance with a second aspect of the present invention, a domain name server apparatus comprises a processor for manipulating data, a memory couple to the process for storing data, connection logic configured to couple the name server to the computer network, at least one domain name stored in the memory, the domain name having associated therewith a network protocol address and having a portion thereof representing the country code, area code, exchange, subscriber number or carrier of a telephone number and logic for generating the network protocol address associated with the domain name. In one embodiment, a plurality of domain name labels are stored in memory, each label having associated therewith a network protocol address, each domain name label representing at least one of the carrier, country code, area code, exchange or subscriber number of a telephone number.

In accordance with a third aspect of the invention, a computer program product for use with a computer system comprises a computer usable medium having program code embodied in the medium for enabling translation of data representing a telephone number of subscriber apparatus into a network protocol address. The program code comprises code for receiving a telephone number domain name from a source, program code responsive to a portion of the telephone number domain name for generating a network protocol address, and program code for forwarding the network protocol address to the source. In one embodiment, the program code further comprises code for storing in the computer system at least one domain name having associated therewith a network protocol address, the domain name representing at least one of the country code, area code and exchange data of a telephone number. In an alternative embodiment, the program code comprises code for storing in the computer system a plurality of domain names, each having associated therewith a network protocol address, each of the domain names representing the carrier, country code, area code, exchange, or subscriber number data of a telephone number.

In accordance with a fourth aspect of the invention, a system for facilitating communication between client tasks executing on a packet-switched data network and subscriber apparatus on a circuit-switched communication network comprises a domain name server operatively coupled to the packet-switched network. The domain name server comprises resolution logic responsive to a telephone number domain name for generating a network protocol address associated with the domain name. The system further comprises a gateway server addressable by a network protocol address. The gateway comprises logic configured to initiate a communication link with subscriber apparatus on a circuit-switched communication network in response to receipt of a telephone number domain name.

BRIEF DESCRIPTION OF THE DRAWINGS

The above and other features, objects, and advantages of the invention will be better understood by referring to the following description in conjunction with the accompanying drawing in which:

FIGS. 5A–C illustrate conceptually the data structures used to implement the present invention;

DETAILED DESCRIPTION

Figure 1:
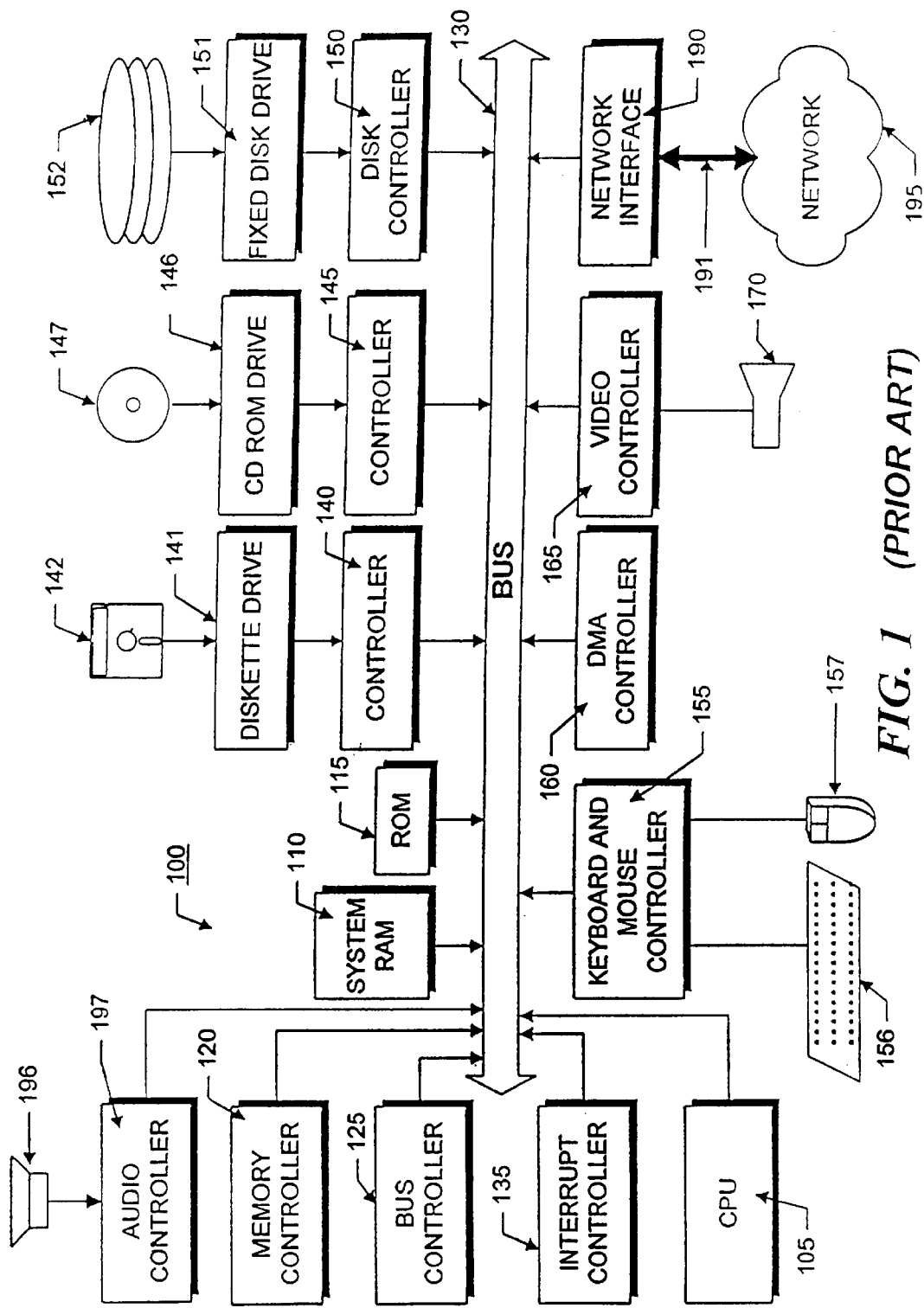
FIG. 1 is a block diagram of a computer systems suitable for use with the present invention.

FIG. 1 illustrates the system architecture for a computer system 100, such as an IBM PS/2® computer on which the invention can be implemented. The exemplary computer system of FIG. 1 is for descriptive purposes only. Although the description below may refer to terms commonly used in describing particular computer systems, such as an IBM PS/2 computer, the description and concepts equally apply to other systems, including systems having architectures dissimilar to FIG. 1.

The computer system 100 includes a central processing unit (CPU) 105, which may include a conventional microprocessor, a random access memory (RAM) 110 for temporary storage of information, and a read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components. Mass storage may be provided by diskette 142, CD ROM 147 or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices such as a pen and/or tablet and a microphone for voice input may be connected to computer system 100 through bus 130 and an appropriate controller/software. DMA controller 160 is provided for performing direct memory access to system RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Computer system 100 is generally controlled and coordinated by operating system software, such the OS/2® operating system, available from International Business Machines Corporation, Armonk, N.Y. The operating system controls allocation of system resources and performs tasks such as process scheduling, memory management, and networking and I/O services, among other things.

Telecommunication Environment

Figure 2:
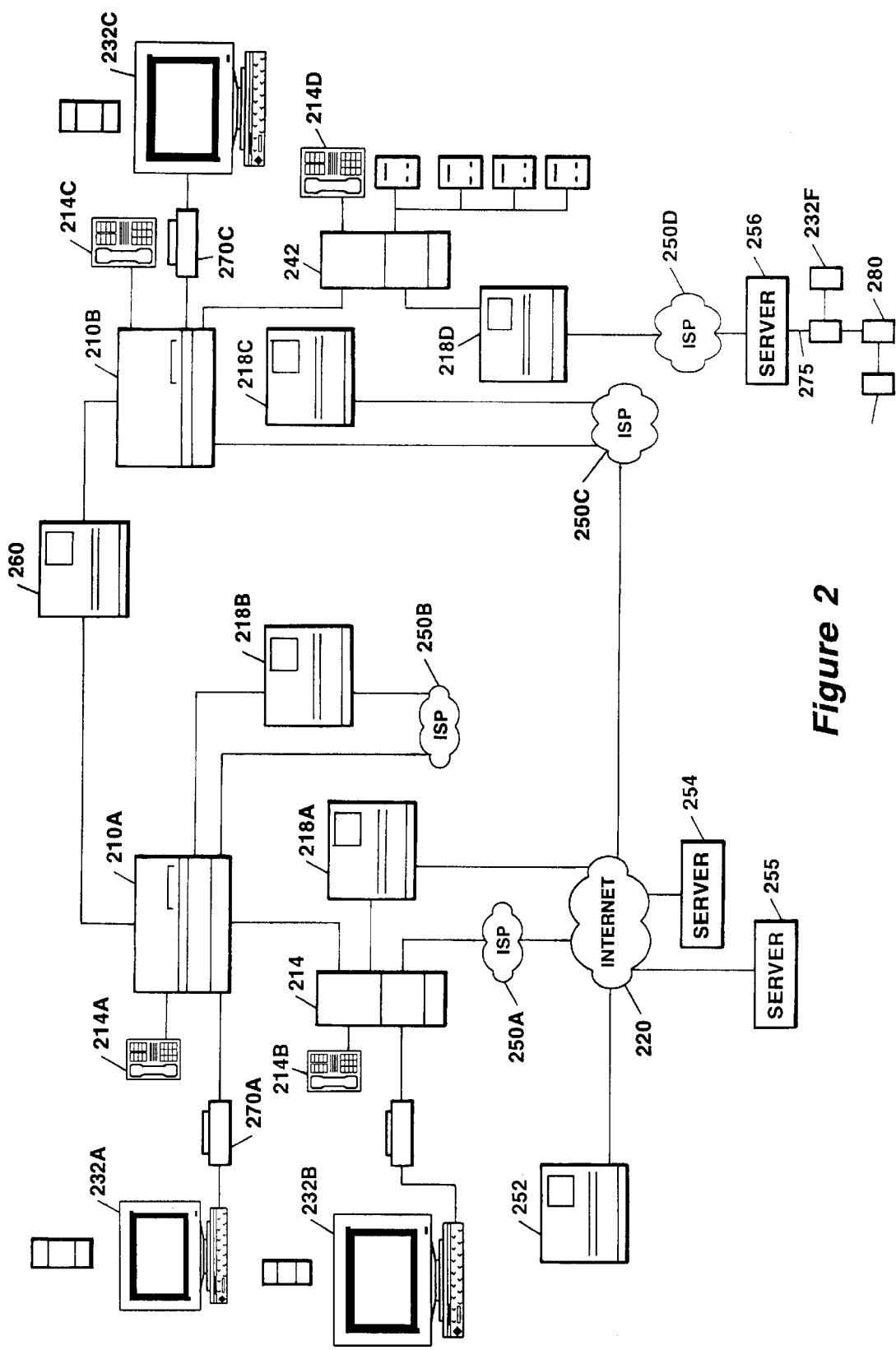
FIG. 2 is a conceptual illustration of a communications network environment in which the present invention may be utilized.

FIG. 2 illustrates a telecommunications environment in which the invention may be practiced such environment being for exemplary purposes only and not to be considered limiting. Network 200 of FIG. 2 illustrates a hybrid telecommunication environment including both a traditional public switched telephone network as well as Internet and Intranet networks and apparatus bridging between the two. The elements illustrated in FIG. 2 are to facilitate an understanding of the invention. Not every element illustrated in FIG. 2 or described herein is necessary for the implementation or the operation of the invention.

A pair of PSTN central offices 210A–B serve to operatively couple various terminating apparatus through either a circuit switched network or a packet switched network. Specifically, central offices 210A–B are interconnected by a toll network 260. Toll network 260 may be implemented as a traditional PSTN network including all of the physical elements including routers, trunk lines, fiber optic cables, etc. Connected to central office 210A is a traditional telephone terminating apparatus 214 and an Internet telephone 232A. Terminating apparatus 214 may be implemented with either a digital or analog telephone or any other apparatus capable of receiving a call such as modems, facsimile machines, etc., such apparatus being referred to collectively hereinafter as a terminating apparatus, whether the network actually terminates. Further, the PSTN network may be implemented as either an integrated services digital network (ISDN) or a plain old telephone service (POTS) network. The Internet telephony is conceptually illustrated as a telephone icon symbolizing the Internet telephone client application executing on a personal computer and interconnected to central office 210A via a modem 270A. Similarly, telephone 214C is connected to central office 210D and WebPhone 232C is connected to central office 210B via modem 270C. Central offices 210A–B are, in turn, operatively coupled to Internet 220 by ISP 250B and 250C, respectively. In addition, central office 210A is coupled to ISP250B by gateway 218B. Similarly, central office 210B is connected to ISP 250C by gateway 218C. In addition, a telephone 214B and Internet telephone 232B, similar to telephone 214A and Internet telephone 232A, respectively, are interconnected to Internet 220 via PBX 212, gateway 218A and ISP 258A. In addition, global server 252 is coupled to the Internet 220 are a domain name system server 254 and 255. Global server 252 may be implemented as described in U.S. patent application Ser. No. 08/719,894, entitled Directory Server for Providing Dynamically Assigned Network Protocol Addresses, previously referenced and incorporated herein. A global server suitable for use as Global Server 252 is commercially available from NetSpeak Corporation in the form of a collection of intelligent software modules including connection server Part No. CSR1, information server, Model ISR1, and database server, Model DBSR1. Name servers 254 and 255 are described as set forth hereinafter. Finally, Internet Service Providers (ISPs) 250A–D may comprise any number of currently commercially available Internet service providers such as America On Line, the IBM Global Network, etc. An Intranet implemented as LAN 275 is coupled to Internet 220 via ISP 250D and server 256. Server 256 may have the architecture as illustrated in FIG. 1 and functions as a proxy server for LAN 275 to which WebPhone 232E is connected via a LAN-based TCP/IP network connector 280. A plurality of Internet telephone 232F and 232E are coupled to LAN 275 via LAN connectors 280. The gateways and Internet telephony client applications may be implemented as set forth in greater detail hereinafter.

WebPhone Client

Internet telephone 232 may be implemented as described in the previously referenced U.S. patent applications incorporated herein by reference. An Internet telephony application suitable for use with the present invention is the WebPhone 1.0, 2.0 or 3.0, client software application commercially available from NetSpeak Corporation, Boca Raton, Fla., referred to hereafter as the WebPhone client. For the remainder of this description, the Internet telephone will be referred to as the WebPhone client. It will be obvious to those reasonably skilled in the arts that other Internet telephone applications implementing similar functionality may be substituted for the WebPhone without affecting the inventive concepts contained herein. The WebPhone comprises a collection of intelligent software modules which perform a broad range of Internet telephony functions. For the purpose of this disclosure, a "Virtual" WebPhone client refers to the same functionality embodied in the WebPhone client application without a graphic user interface. Such virtual WebPhone client can be embedded into a gateway, automatic call distribution, server, or other apparatus which do not require extensive visual input/output from a user and may interact with any other WebPhone clients or servers adhering to the WebPhone protocol. For the purpose of this disclosure, WebPhone 232 or any of the virtual WebPhones implemented in other apparatus, may be considered WebPhone client applications, "WebPhone Clients", as opposed to other apparatus such as the connection/information server, which adheres to the WebPhone Protocol.

The WebPhone software applications may run on the computer system described with reference to FIG. 1, or a similar architecture whether implemented as a personal computer or dedicated server. In such an environment, the sound card 197 accompanying the computer system 100 of FIG. 1, may be an MCI compliant sound card while communication controller 190 may be implemented through either an analog modem 270 or a LAN-based TCP/IP network connector 280 to enable Internet/intranet connectivity.

The WebPhones, as well as any other apparatus having a virtual WebPhone embodied therein, each have their own unique E-mail address and adhere to the WebPhone Protocol and packet definitions, as extensively described in the previously referenced U.S. patent applications. For the reader's benefit, short summary of a portion of the WebPhone Protocol is set forth to illustrate the interaction of WebPhone clients with each other and the connection/information server when establishing a communication connection.

Each WebPhone client, may serve either as a calling party or a caller party, i.e. the party being called. The calling party transmits an on-line request packet to a connection/information server upon connection to an IP-based network, e.g. the Internet or an Intranet. The on-line request packet contains configuration and settings information, a unique E-mail address and a fixed or dynamically assigned IP address for the WebPhone client. The callee party, also a utilizing a WebPhone client, transmits a similar on-line request packet containing its respective configuration and setting information, E-mail address and IP address to the same or a different connection server upon connection to an IP-based network. The calling party originates a call by locating the callee party in a directory associated with either its own WebPhone client or the connection/information server to which it is connected. The callee party may be identified by alias, E-mail address or key word search criteria. Once the E-mail address of the calling party is identified, the calling party's WebPhone forwards a request packet to the connection/information server, the request packet containing the callee party's E-mail address. The connection/information server uses the E-mail address in the received request packet to locate the last known IP address assigned to the callee party. The connection/information server then transmits to the calling party an information packet containing the IP address of the callee party. Upon receipt of the located IP address from the connection server, the calling party's WebPhone initiates a direct point-to-point communication link with the callee party by sending a call packet directly to the IP address of the callee party. The callee party either accepts or rejects the call with appropriate response packets. If the call is accepted, a communication session is established directly between the caller and the callee, without intervention of the connection/information server. The above scenario describes establishment of a communication link which originates and terminates with clients on an IP-based network.

Gateway Architecture

To facilitate interaction with WebPhone clients, a virtual WebPhone is implemented in the gateway 218, either executable in RAM memory or embedded in ROM memory associated with such apparatus. The gateway 218 comprises a virtual WebPhone which acts as a proxy device and voice processing hardware that bridges from an IP-based network to a PSTN network. The gateway 218 may be implemented with either a microprocessor based architecture or with dedicated digital signal processing logic and embedded software. A gateway suitable for use as gateway 218 with the present invention is either NetSpeak Model Nos. WGX-MD/24, a 24-port digital T-1 IP telephony gateway, or WGX-M/16, a 16-port analog IP telephony gateway, both commercially available from NetSpeak Corporation, Boca Raton, Fla. Gateway 218 is described in greater detail with reference to FIG. 3 hereinafter.

Figure 3:
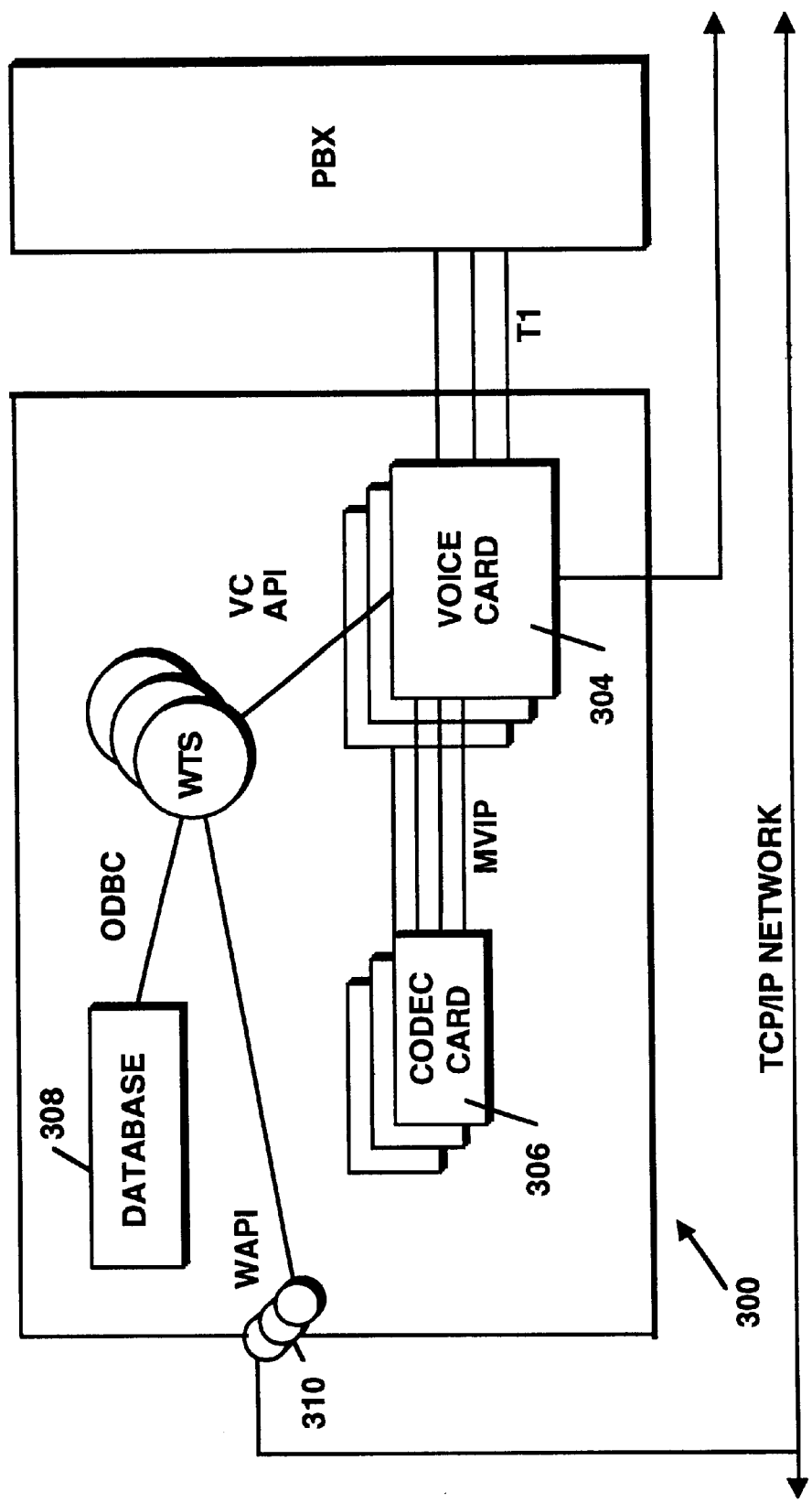
FIG. 3 is a block diagram of a gateway system in accordance with the present invention.

FIG. 3 illustrates the system architecture for gateway 300, which may be implemented as gateway 218. Gateway 300 may be implemented using a computer architecture similar to computer system 100 described with reference to FIG. 1, such elements having been described in detail and not shown in FIG. 3. In addition, gateway 300 comprises a server 302, one or more voice cards 304, one or more compression/decompression (codec) cards 306, a database 308 and a network interface 310. Server 302 may embody one or both of the architecture function of the connection server and information servers similar to those embodied in global server 252 and as described in detail in the previously referenced copending patent application. The server 300 is a multiple-instance server implementing the WebPhone protocol that functions as a connection server to provide connectivity to global server 252 and as a virtual WebPhone on behalf of a telephone that is connected to either a public branch exchange, such as PBX 212, or a central office, such as central office 210A. Each instance of the server 300 interfaces with one channel of voice card 304 via the application program interface on the voice card, to provide a conversation path between a conventional telephone and a WebPhone or database 308.

The voice card 304 provides a T-1 or analog connection to the PBX or central office or analog telephone lines which have a conventional telephony interface, for example, DID, ENM. The voice card application program interface enable the instance of server 300 to emulate a conventional telephone on a PBX or central office of a PSTN carrier. Multichannel audio compression and decompression is accessed by server 300 via application program interfaces on the respective sound cards and is processed by the appropriate audio codec. Any number of commercially available voice cards may be used to implement voice card 304. Similarly, any number of commercially available audio codecs providing adequate audio quality may be utilized. Each instance of server 300 interfaces with the TCP/IP network through a series of ports which adhere to the WebPhone protocol. Gateway 300 interfaces with the T1 line of the PSTN network through the interfaces contained within voice card(s) 304.

Gateway 300 may optionally include a database 308 which may be implemented using any number of commercially available database server products including Microsoft SQL Server 6.X. Database 308 interacts with each instance of server 302 typically via ODBC format.

In the preferred embodiment, gateway 300 is a combined software hardware implementation which runs on an operating system such as Windows NT.

Telephone Domain Name Server Architecture

Figure 4:
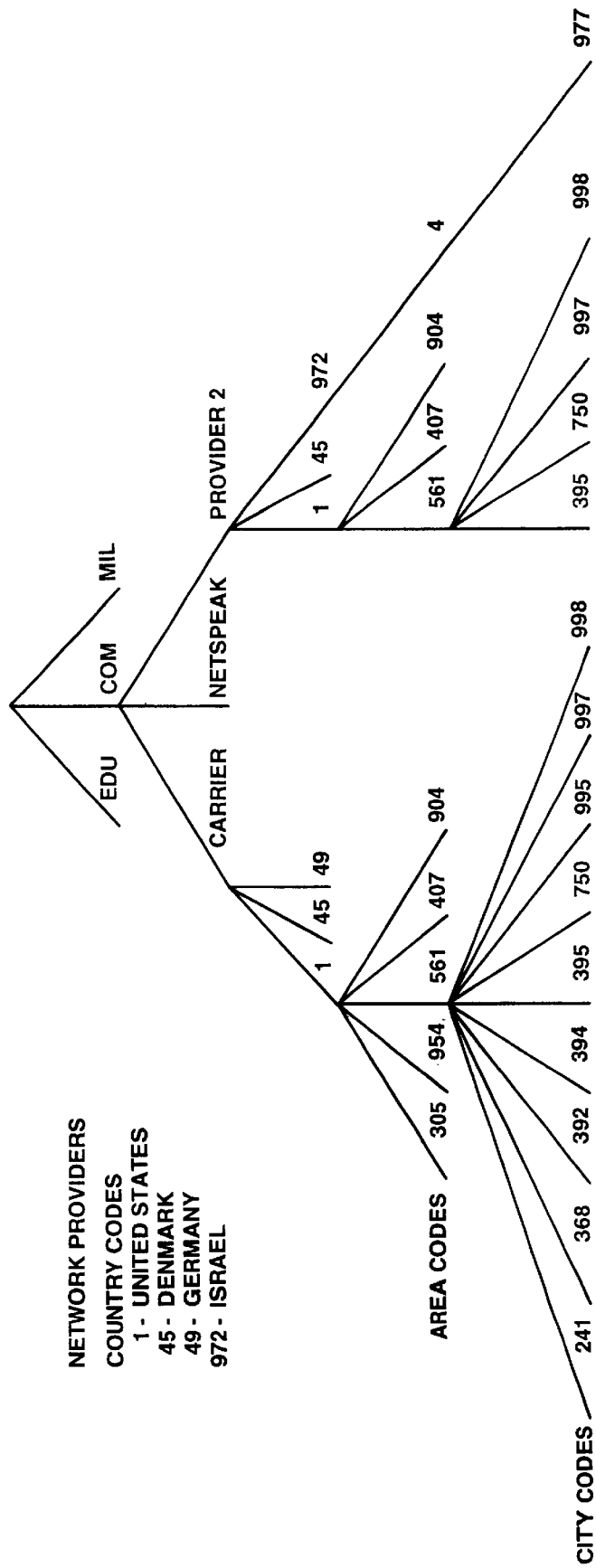
FIG. 4 illustrates conceptually a hierarchical domain naming structure utilized with the server of the present invention.

FIG. 4 illustrates conceptually a small part of the Internet domain hierarchy tree in accordance with the present invention. At the top of the tree is the unnamed root.

Underneath the root are top level subdomains including .edu, .com, .mil, as illustrated, as well as .gov, .net, .arpa, .int, and various country code abbreviations, (not illustrated). Underneath the ".com" domain are the subdomains "carrier", "NetSpeak" and "provider 2". Underneath the "carrier" and "provider 2" domains exists a tree hierarchy of each their respective subdomains representing the country codes, area codes and exchange codes of traditional telephone numbers. For example, the country codes for the United States, Denmark, and Germany exist under the domain name node "carrier.com." Under the domain name "1" for the United States country code, exists a number of subdomain name representing selected area codes in the United States. Similarly, underneath the domain name for area code "561", exists a plurality of subdomains for the exchanges contained within area code 561, etc. The parent domain name for provider2.com is arranged similarly with different respective values. In this manner, the geographical dialing patterns of traditional PSTN telephone numbers have been arranged into an organization hierarchy similar to the domain name system hierarchy used by the domain name system and which further identify the IP address of the gateway to dial the terminating equipment.

Any of the domain name servers, including primary domain name server 254, as well as the domain name servers used to resolve a telephone domain name into network protocol addresses may be implemented utilizing the computer architecture described with reference to FIG. 1 herein. The actual implementation of the data structures utilized to resolve a domain name or subdomain name to a network protocol address may be implemented as illustrated in FIG. 5A–C. FIG. 5A illustrates a look-up table-type data structure which may be retained in system memory and utilized by a carrier domain name server to resolve country code subdomain names into the network protocol addresses of a country code domain name server. FIG. 5B illustrates a look-up table type data structure which may be retained in system memory and utilized by a country code domain name server to resolve area code subdomain names into the network protocol addresses of area code domain name servers. FIG. 5C illustrates a look-up table type data structure which may be retained in system memory utilized by an area code domain name server which may be utilized to resolve exchange subdomains into the network protocol addresses of either the respective corresponding gateway or a subscriber domain name server. In FIG. 5A–B, the network protocol addresses are illustrated as having a format similar to that utilized by the Internet protocol. It will be obvious to those reasonably skilled in the art that as the Internet protocol evolves and/or new network protocols are adopted, that the actual format and implementation of the network protocol address may be modified accordingly without effecting the telephone domain name resolution process. Further, the actual format of the subdomain identifier into each of the look-up tables in FIG. 5A–C may be implemented with any number of reference formats.

The invention contemplates that the data structures illustrated in FIGS. 5A–C, respectively may be combined and implemented on a single server. In a single server solution, the server may be the carrier domain name server and can resolve all references to country code, area code, exchange code and possibly subscriber subdomains directly to the appropriate network protocol address of the relevant gateway internally within the carrier domain name server itself or with an appropriate messaging protocol without having to return to either the WebPhone client application or the primary name server at each level during the domain name resolution process. Such a single server embodiment lends itself more readily to recursive resolution of a telephone number domain name. In such an embodiment, the primary domain name server need only contact the root domain name server for the domain name system and possibly one or two additional domain name servers before reaching the carrier domain name server which performs the majority of the resolution translation activities.

Alternatively, the data structures for the domain name servers illustrated in FIGS. 5A–C each may be implemented with separate respective domain name server platforms, such embodiment lending itself more readily to a distributed domain name server environment.

For the reader's benefit, some background information is provided to illustrate how name queries are resolved within the Domain Name System using the name resolver protocol and name servers. The mechanism in which the Domain Name System maps domain names to addresses consists of an independent cooperative system of name servers. A name server such as server 254 of FIG. 2 comprises a server program that supplies name-to-address translation, and mapping from domain names to Internet Protocol addresses. The server comprises the server software typically referred to as the name resolver and the dedicated processor which is referred to as the name server. The name resolver may use one or more name servers when translating a domain name query.

There are two ways to use the domain name system to resolve a domain name query. First, domain name servers may be contacted one at a time for each domain address. Alternatively, a single domain name server may perform a complete translation. In either case, the client software forms a domain name query that contains the name to be resolved. If a client application requests a complete translation, i.e., a recursive resolution, the a primary name server contacts a domain name server that can resolve the name and return the answer to the client. If the client application requests a nonrecursive solution, i.e. an iterative solution, the primary name server will not supply an answer but only generates a reply that specifies the name server the client application should contact to resolve the next portion of the name. In accordance with the Domain Name System, each Domain Name server is required to know the address of at least one route server and must know the address of the server for the domain immediately above it, i.e., the parent domain. Domain name servers use predefined ports for all communications so that clients know how to communicate with a name server once the IP address of the computer on which the server is executing is known. Numerous publicly-available documents describe the domain name system in greater detail including a work entitled Internet Working With TCP/IP Volume 1 by Douglas E. Comer, 2d Edition.

Multiple communication scenarios are available through the network illustrated in FIG. 2. To facilitate a better understanding of a communication between a packet-switched network and a circuit switched network, examples of communications over each of those types of networks are first set forth for the reader's benefit. In FIG. 2, a circuit switched telephone network may comprise the operative interconnection of telephone 214A, central office 210A, toll network 260, central office 210B and telephone 214C. A caller at telephone 214A would place a call by dialing the appropriate telephone number of telephone 214C. Central offices 210A–B of the respective carriers will make the appropriate connections through the toll network 260 to establish the connection. Since a toll network is utilized, this scenario likely entails a long distance connection. A simpler example of a circuit switched connection would be the operative interconnection of telephone 214A, central office 210A, PBX 212 and telephone 214B. Since toll network 260 is not used this scenario is more characteristic of a telephone call within a single exchange.

A communication link over a packet-switched network may be established with the network illustrated in FIG. 2, using the WebPhone protocol as disclosed in U.S. patent application Ser. No. 08/533,115 entitled "POINT-TO-POINT INTERNET PROTOCOL" by Glenn W. Hutton, filed Sep. 25, 1995, previously incorporated herein by reference. Specifically, WebPhone 232A may connect to Internet 220 through central office 210A, ISP 250B and register with global server 252, notifying server 252 of its current dynamically signed Internet protocol address. Subsequently, WebPhone 232A may inquire as to the current Internet protocol address of another WebPhone client, for example, WebPhone 232C. If WebPhone 252 is currently connected to the Internet and has likewise registered with the global server 252 will return the Internet protocol address of WebPhone 232C to WebPhone 232A. WebPhone 232A may then establish a direct connection to WebPhone 232C via central office 210A, ISP 250B, Internet 220, ISP 250C, and central office 210B. Alternatively, a point-to-point connection over a packet-switched network may be established over a local area network 275 by means of a direct connection from WebPhone 232E to 232F, such connection being possible if the Internet protocol addresses of the respective WebPhones are fixed.

The present invention provides a solution for communications which cross between circuit-switched (PSTN) networks and packet switched (TCP/IP) networks. The invention addresses at least three calling scenarios involving dialing techniques between any of the WebPhone clients and the gateways. The three dialing scenarios are: 1) WebPhone client to gateway to PSTN, 2) PSTN to gateway to WebPhone Client, and 3) PSTN to first gateway to second gateway to PSTN, as described in greater detail below.

Scenario1, WebPhone Client to GATEWAY to PSTN

In the illustrative embodiment, the invention enables a user to enter a traditional phone number through the graphic user interface of the WebPhone client and establish a call to the specified telephone exchange on a PSTN. A user enters a destination telephone number consisting of country code, area code, exchange and subscriber number segment or data, for example "1-561-997-4001", into the WebPhone client utilizing either the WebPhone virtual keypad or computer keyboard. For purposes of this disclosure, exchange data such as "997" in the above example, are considered to be the same as city codes. For convenience, the WebPhone client may be configured to recognize when either the country or area code information is missing and to insert, by default, a user-defined country code or area code. In the above example, entering 997-4001 would default to a local country code of "1" and area code "561". Alternatively, the local gateway 218 may be configured with the appropriate country, area, and city codes, the user need only dial "997-4001" and gateway 218 will append the predefined country and area codes, as explained hereafter. The WebPhone client may also be configured with a default or user selectable PSTN carrier such as MCI, Sprint, AT&T, etc., such carrier will be referred to generically hereafter as "carrier.com" . Upon receiving the desired telephone number the WebPhone client reverses the number and appends the carrier's domain name resulting in a hybrid telephone/domain name having the form "4001-997-561-1.carrier.com". The hybrid telephone number domain name referred to hereafter as the "telephone number domain name" is passed by the WebPhone client to in an acceptable format the name resolver protocol executing on a DNS name server on the TCIP/IP network, as described hereinafter.

Figure 6:
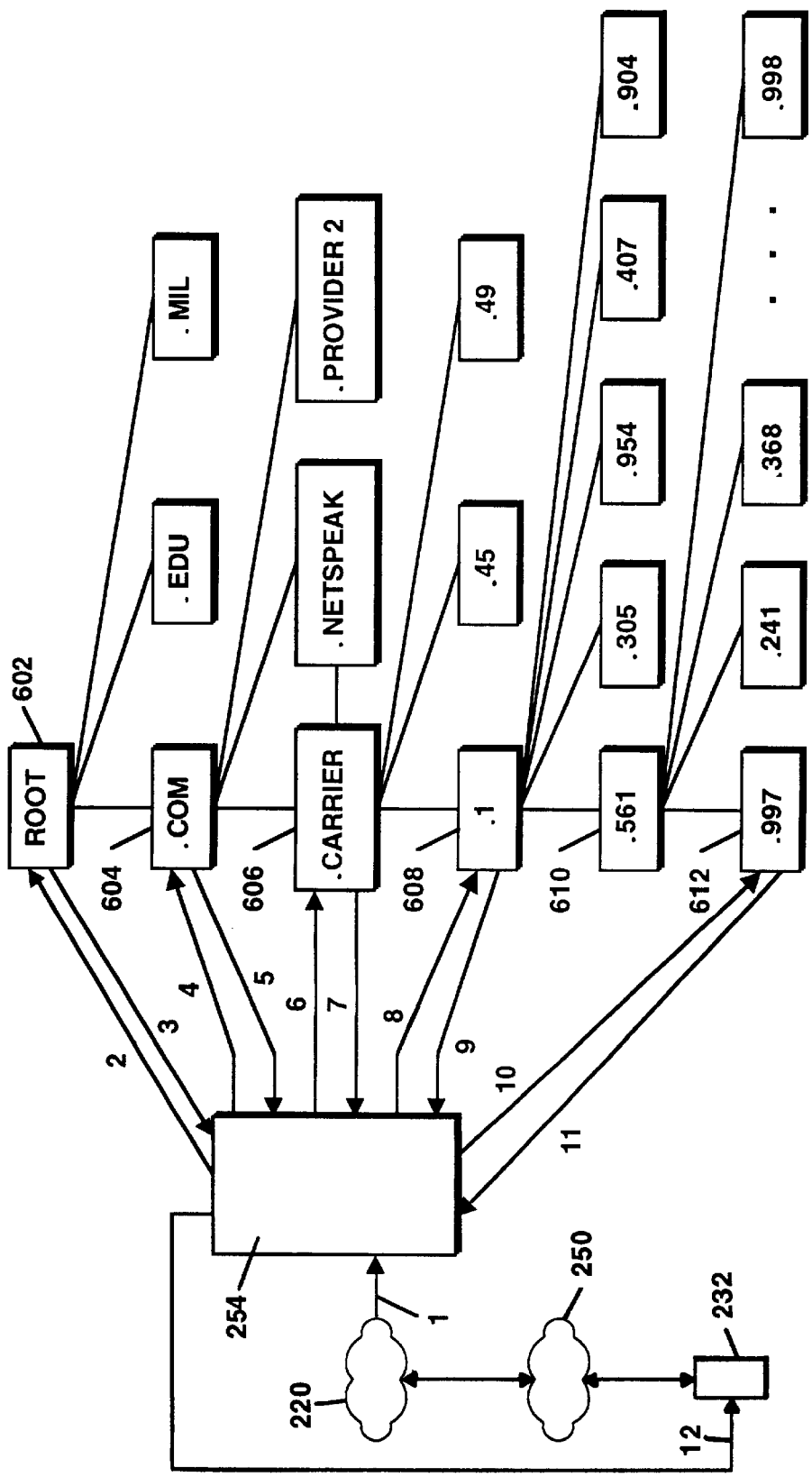
FIG. 6 illustrates conceptually the inventive steps utilized to resolve a telephone number to a network address of a gateway in accordance with the present invention.

FIG. 6 illustrates conceptually the arrangement of domain name servers of the domain name hierarchy illustrated in FIG. 4. In theory, each server knows the addresses of lower level servers for all subdomains within the domain for which that name server it is responsible. Realistically, a name server for an organization such as carrier.com is connected directly to the root name server. At each node of the domain name tree constructed under the "carrier.com" or "provider2.com" node, a name server is configured to return a referral packet containing the IP address of one or more child domain servers. It will be obvious to those skilled in the art that a separate physical name server does not have to exist for each subdomain. A single physical server may function as the name server for multiple domains, so that the entire domain hierarchical tree structure for "carrier.com" or "provider2.com" could be configured and supported by one physical server apparatus.

Referring to FIG. 6, a recursive process of resolving the telephone number domain name previously entered into the WebPhone client to the appropriate IP address of a gateway on a PSTN is illustrated conceptually: In step 1, the WebPhone client 232 forwards the telephone number domain name to primary name server 254 in packetized form via Internet 220 and ISP 250. Using a name packet, primary name server 254 queries the root name server of the domain name system (DNS) for the address of "4001.997.561.1.carrier.com" in step 2. The name server for the DNS root returns a reference to the name server for ".com" in step 3. Next, name server 254 queries the referenced name server ".com" for the address of "4001.997.561.1.carrier.com" in step 4. In response, a referral to "carrier.com" is returned in step 5. Name server 254 then queries the name server "carrier.com" for "4001.997.561.1.carrier.com" in step 6. In response, a referral to "1.carrier.com" is returned in step 7. Name server 254 then queries the name server to "1.carrier.com," for "4001.997.561.1.carrier.com" in step 8. In response a reference of "561.1.carrier.com", is returned in step 9. Name server 254 then queries name server for "561.1.carrier.com," in step 10 for "4001.997.561.1.carrier.com." In response, a reference to "997.561.1.carrier.com" is returned in step 11. This last reference contains the IP address of the desired gateway which is then forwarded via Internet 220 and ISP 250 to WebPhone client 232 by name server 254 in step 12. In the above-described process, the resolution is executed to the level of the exchange code "997." It will be obvious to those reasonably skilled in the art that the domain name level may be further resolved if the appropriate name server hierarchy is arranged to allow for resolution to the actual subscriber number domain level or partial subscriber number level. In such an embodiment, specific gateways would be associated with subscriber numbers, therefore allowing the additional step of resolution, using the domain name system.

The process illustrated by FIG. 6 is a recursive process for resolving a telephone number domain name to a network protocol address. The technique of using an iterative process to resolve a telephone number domain name to a network protocol address is substantially similar as that illustrated with reference to FIG. 6 except that the references or network protocol addresses to the respective name servers are returned to the WebPhone client application at each level, either directly or through the primary name server. With such embodiment, rather than the primary name server performing the complete domain name resolution, the WebPhone client is involved at multiple subdomain levels. For example, in step 3, a reference to the name server for ".com" would be returned directly to the WebPhone client either from the name server for DNS route or through the primary name server. In response, the client application will pass a name packet containing the telephone number domain name to the name server for ".com" identified by the reference. Similar interactions between the client application and the respective domain name servers occur for steps 5–11, which will not be described hereinafter.

After step 12 of FIG. 6, the call packet containing the entire telephone number domain name entry "4001.997.561.1.carrier.com" is then sent to initiate a call session to the IP address of the gateway, for example, gateway 218C, and the call is offered. The gateway 218C, depending on available resources, then evaluates the call packet data, responds accordingly by dialing 1-561-997-4001 and accepts the call. A call session is then established. The gateway may be coupled directly to a PSTN without connection through either a central office, as illustrated in FIG. 2. Once a call is established, the gateway serves to translate the packetized audio data from the packet switched-based network into analog or digital signals for the circuit-switched telephone network. The gateway further serves to translate either audio or digital signals from the PSTN network into packetized audio data suitable for transmission over a IP-based network to the WebPhone client.

The reader will appreciate from the foregoing description that the invention provides a method in which an Internet telephone such as the WebPhone clients may specify a traditional telephone number, have that telephone number translated into the IP address of an appropriate gateway by the existing Domain Name System on the Internet, and have the gateway perform the connection through to the telephone on the public switched telephone network. By utilizing the invention as previously described, a gateway may be selected on a least cost routing basis to minimize the toll charges on a traditional PSTN network. For example, if a call is originating with an Internet telephone in the United States to a PSTN apparatus in Germany, the invention may be utilized to identify a gateway in Germany proximate to the terminating apparatus rather than a gateway in the United States. As such, a substantial portion of the costs of the call can be transmitted over the Internet more cheaply than if traditional long-distance and overseas carrier lines were utilized.

The invention further contemplates a model for overriding a default preferred carrier. Suppose that the subscriber intends to use "provider2" to reach the same number. At the user interface, the entered number would be "1-561-997-4001 @@provider2.com". Implemented in this manner, the dialed entry fails the rules for valid E-MAIL addresses. The client WebPhone software, recognizing two @ symbols and the numeric data representing the terminating phone number, could parse the entered data and generate the required domain name of "997.561.1.provider2.com".

The mechanism could be modified to be more readily apparent to the user, but the technique would remain the same.

One or more gateways installed in the above network may be assigned to their own unique E-MAIL addresses. If this information is known to the subscriber, the technique illustrated herein may be modified slightly and be used to route a call to a specific gateway. If the desired WGX was "boca561.997@provider2.com", a user could place the call "1-561-997-4001@boca561.997provider2.com. The WebPhone client, recognizing this as a phone number, would resolve the IP address for "boca561.997@provider2.com" but pass 1-561-887-4001 as the phone number in the call packet when offering the call. If the desired gateway has a fixed IP address, the WebPhone client may connect to the gateway directly and pass the "name" phone number in the call packet when offering the call to the gateway. If the gateways IP address is dynamically assigned, the WebPhone client would contact the global server 252 for the current Internet protocol address of the desired server. Upon receiving such IP address, the WebPhone client would contact the server directly, passing the phone number in the call packet when offering the call. This particular technique is useful when a WebPhone client makes frequent calls to a specific gateway. The WebPhone client may be modified to include either a cashing algorithm or a small directory which includes the E-mail addresses and/or IP addresses of those gateways most frequently called by the WebPhone client. In this manner, the previously described technique for resolving the IP address of a gateway utilizing the domain name system may be avoided and the call initiated directly from the WebPhone client to the gateway, and, ultimately, to the PSTN subscriber.

AAs an alternative to the illustrative embodiment, a provider may install routers or define subnets or some combination thereof for the nodes in its respective domains. Additionally, routers or equipment that manage the subnets may apply algorithms optimized to phone number lookups rather than the general algorithms previously described for resolving names. In the Internet/Intranet environment, these methods are applicable independent of the physical medium on which the communication takes place.

Figure 7:
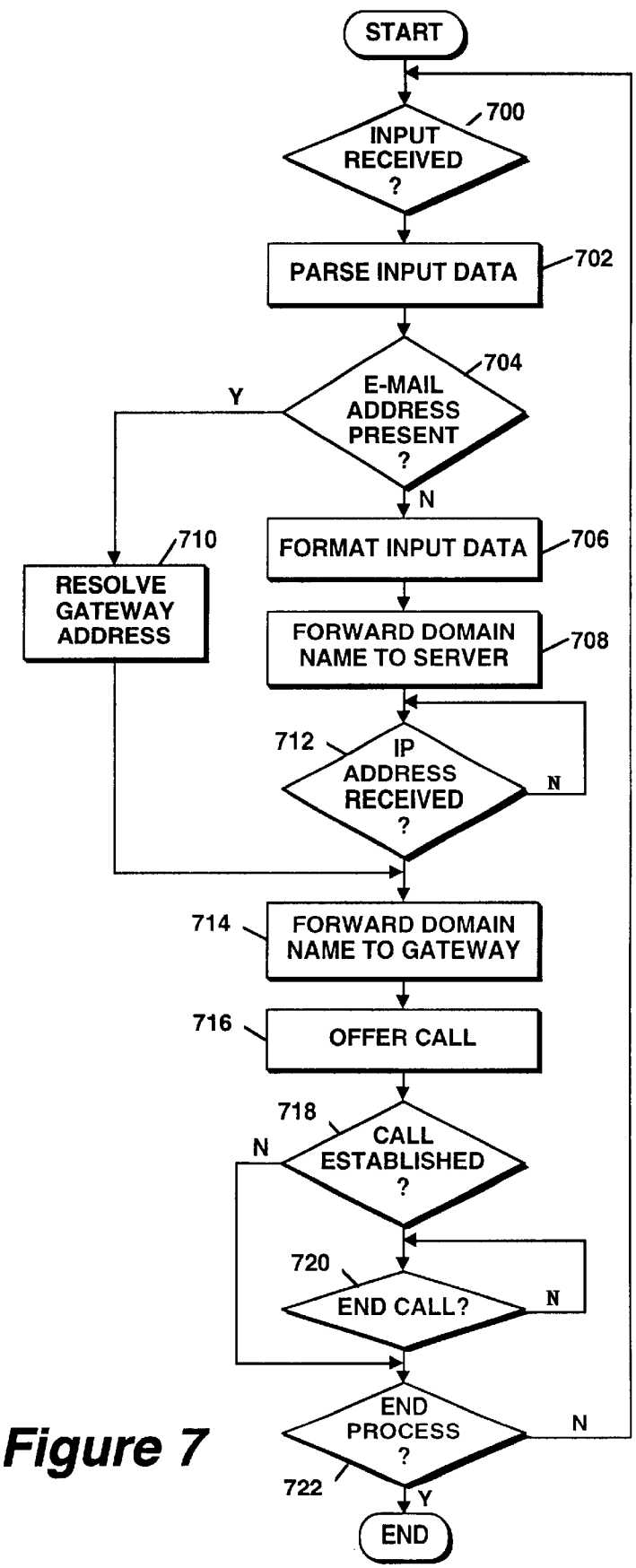
FIG. 7 is a flow chart illustrating the process steps of the method in accordance with the present invention.

FIG. 7 is a flow chart illustrating the basic process steps used by the WebPhone client in accordance with the present invention. The coding of the process steps of the illustrated flowchart into instructions suitable to control the WebPhone client will be understood by one having ordinary skill in the art of programming. Following power-on initialization and registration with global server 252, the WebPhone client process remains idle until detecting a telephone number input from either the virtual keyboard or the hardware keyboard associated with the computer on which the WebPhone client is executing, as illustrated by decisional step 700. The input "name" is then parsed by the WebPhone client as illustrated by process 702 to determine whether or not an E-mail address of a gateway is present within the input character string, as illustrated by decisional block 7504. If no E-mail address for a carrier gateway is present within the input name, the name is formatted as illustrated in procedural step 706. As described previously, formatting may include reversing the order of the actual segments of the phone number name as well as pending predefined or default values for country codes, area codes, and carriers, etc. Once the phone number domain name has been properly formatted, as illustrated in procedure step 706, the names forwarded to a domain system server as previously described. The WebPhone client awaits the return of the IP address of the gateway as determined by one or more domain name system servers in accordance with the process steps previously described with reference to FIG. 4, e.g. iterative resolution of the domain name supplied. If, in decisional step 704, the E-mail address of a gateway had been entered, the WebPhone client would attempt to resolve the IP address of the gateway either from its own local directory, in the event of a gateway having a fixed IP address, or through clearing the global server 252 to which the WebPhone client is operatively coupled over an IP-based network.

Having received the Internet protocol address of the appropriate gateway, either through process step 710 or from a domain name server, the WebPhone client forwards a call packet containing the telephone number domain name to the gateway and offers a call, as illustrated in procedural step 714 and 716. If a call is established, as illustrated in decisional block 718, the WebPhone client will function as described in the previously referenced patent applications. Otherwise, the WebPhone client will eventually return to an idle mode, awaiting input for an additional telephone number data. In the event a call is established, the WebPhone will detect the disconnection of the call as illustrated in procedural block 720 and will return to an idle state if not powered down, as illustrated by decisional block 722.

The reader will appreciate that the inventive technique provides a method for entering traditional PSTN telephone numbers into an Internet telephone application and having the call completed through use of the domain name server and a gateway to complete the call in the manner which is efficient and may be substantially transparent to the user.

Scenario 2, PSTN to GATEWAY to WebPhone Client

A gateway user calling from the PSTN would be prompted for the desired phone number and user number and pin code via voice response or voice recognition techniques. The virtual WebPhone proxy device functions similar to Scenario. The destination phone number is resolved based on the configured location of the gateway (country code, area code, exchange, etc.), and the configured service provider. Scenario 2 is similar to Scenario 1 except that the gateway may be configured with user information, including E-MAIL and phone number of a specific WebPhone client, and then utilized as a inverse connection server to return the E-MAIL address of the desired parties' WebPhone client. The gateway through which a PSTN originating call is received would be configured with information indicating which connection server, similar to global server 252, contains the E-mail address corresponding to the desired phone number. The gateway then connects to the global server to determine the current IP address of the WebPhone client callee. Upon receiving the IP address of the WebPhone client, the gateway then establishes a direct contact to the WebPhone client and offers the call. When the WebPhone client is reached, the user, through the capabilities of the virtual WebPhone proxy software of the gateway, has the ability to leave online or offline voice mail or communication in real time, if desired.

Scenario 3, PSTN to GATEWAY to GATEWAY to PSTN

The technique utilized in the previously described Scenario 2 may be utilized to establish calls originating and ending at PSTN apparatus, but which utilize a portion of a IP-based network, typically to reduce costs. For example, in the previously described scenario, instead of contacting a global server for the IP address of the destination WebPhone client, the gateway would be configured with information relating to which other gateway would be most suitable in accordance with any number of predetermined conditions, including lease cost routing, to complete the call. The initially contacted gateway would then contact the selected gateway, using either the E-mail address of the gateway or a fixed IP address and offer a call packet, including the destination phone number. If the call is accepted, a real-time communication link will be established from telephone 214A, to gateway 218B, through ISP 250B, Internet 220, ISP 250C, gateway 218C, and onto telephone 214C. As such, the single communication link will originate on a circuit switched network, bridge a packet-switched data communication network, and terminate on a second circuit-switched network.

Subscriber Validation and Billing

In addition to the inventive technique for calling over the Internet/Intranet, the ability to validate a subscriber's identity and rights and perform billing services is desirable. In the WebPhone client, one piece of required information is a subscriber phone number. In the client implementation, this is intended to be a valid traditional phone number for the user's home or office desktop phone. If this phone number comprises a country code, area code, exchange and subscriber number, and additionally a user pin code (or 4 or more digits), the phone number can be resolved to a specific domain and gateway, and the user may be validated by their respective home access gateway. A gateway, which provides service for the user, is configured with similar information. For example, the user, configured with a home number and pin code desires to place a call to "972-4-99777-583" in Israel. Additionally, the user is currently located in Germany. The user configuration information, which may or may not employ encryption depending on the secure nature of the network, would be sent by the client in a user validation packet to the gateway servicing "4001.997.407.1.carrier.com". A response approving or disapproving the individual is returned. The client then repeats the above phone number resolution process for the terminating number "583.9977.4.972.provider2.com".

In a similar method to that described for subscriber validation, billing information may be collected by the gateway and collected later over the same network. Call statistics (destination, length of call, number of bytes transferred, quality of service, etc.) may be collected by the home gateway and periodically downloaded and analyzed.

The gateway may function as a personal attendant for the subscriber, since user network related queries may be resolved at the gateway, the gateway could offer services such as voice mail, find me—follow me services, custom outgoing message storage site, personal out going messages storage/playback based on caller id information, account information retrieval, LAPD personal directory and business card information, etc. Depending on available resources such as available memory, processor capability and network bandwidth, a gateway may provide services for 10,000 or more customers.

The techniques described herein for call resolution and user validation distributes the load while also improving reliability, and further, does not preclude alternate call resolution strategies when success is not achieved. The reliability and success rate of placing calls may be improved by employing alternate techniques according to error conditions. Failure to resolve the gateway address may result in a second attempt. Clients sending ONLINE packets with a specified service provider may be forwarded a list of containing the E-MAIL or IP addresses for other redundant, alternate equipment in the event of an equipment failure along with instructions to direct the ONLINE packet to one of the alternate servers or gateways.

The above described inventive technique may be utilized regardless of the specific name of the domain under which the carrier name server is implemented. For example, the authority which regulates domain names may add a special ".tel" domain specifically designed for carriers and other businesses providing telecommunication services. Such a domain name would facilitate ease of use of the technique but would not change the technique described herein.

A software implementation may comprise a series of computer instructions either fixed on a tangible medium, such as a computer readable media, e.g. diskette 142, CD-ROM 147, ROM 115, or fixed disk 152 of FIG. 1A, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. Further, many of the system components described herein such as the WebPhone client application and the gateway have been described using products from NetSpeak Corporation. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. A method for resolving data representing a telephone number of subscriber apparatus on a circuit-switched communication network into a network protocol address on a packet-switched data network, the method comprising:

A. receiving a telephone number domain name derived at least in part from a reordered portion of the telephone number;

B. resolving the telephone number domain name into a network protocol address; and C. supplying the network protocol address to the source;

wherein the telephone number comprises a plurality of segments, and the reordered portion comprises the segments in a reverse order while maintaining the number sequence of each segment.

2. The method of claim 1 wherein at least a portion of the telephone number domain name represents one of the carrier, country code, area code, exchange and subscriber number segment of the telephone number.

3. The method of claim 1 wherein the telephone number domain name comprises a segment representing a carrier domain name and step B comprises:

B.1 resolving a carrier domain name into a network protocol address of a carrier name server;

B.2 forwarding at least a portion of the telephone number domain name to the carrier name server.

4. The method of claim 1 wherein the telephone number domain name further comprises a country code domain name and wherein step B further comprises:

B.1 resolving the country code domain name into a network protocol address of a country code domain name server;

B.2 forwarding the country code domain name to the country code domain name server.

5. The method of claim 1 wherein the telephone number domain name further comprises an area code domain name and wherein step B further comprises:

B.1 resolving the area code domain name into an network protocol address of an area code domain name server;

B.2 forwarding the area code domain name to an area code domain name server.

6. The method of claim 1 wherein the telephone number domain name further comprises an exchange domain name and wherein step B further comprises:

B.1 resolving the exchange domain name into a network protocol address of an exchange domain name server; and B.2 forwarding the exchange domain name to the exchange domain name server.

7. The method of claim 1 wherein the telephone domain name comprises data representing the telephone number.

8. The method of claim 7 wherein the telephone domain name further comprises data representing a carrier domain name.

9. The method of claim 1 wherein the network protocol address comprises an Internet protocol address.

10. A domain name server apparatus for use on a computer network, the server apparatus accessible by one or more source client processes executing on the computer network, the domain name server apparatus comprising:

a processor for manipulating data;

a memory coupled to the processor for storing data;

connection logic, coupled to the processor and the memory, configured to couple the domain name server to a computer network;

at least one domain name stored in the memory, the domain name having associated therewith a network protocol address and having a portion thereof derived at least in part from a reordered portion of a telephone number;

resolution logic, responsive to at least a portion of a telephone number domain name received from a source, for generating a network protocol address associated with the portion of the telephone number domain name and for supplying the generated network protocol address to the source;

wherein the telephone number comprises a plurality of segments, and the reordered portion comprises the segments in a reverse order while maintaining the number sequence of each segment.

11. The domain name server apparatus of claim 10 further comprising:

a plurality of domain name labels stored in memory, each label having associated therewith a network protocol address, each domain name label representing at least one of the carrier, country code, area code, exchange and subscriber number segment of a telephone number.

12. The domain name server apparatus of claim 10 further comprising:

a plurality of domain name labels stored in memory, each domain name label having associated therewith a network protocol address, each domain name label representing country code data of a telephone number.

13. The domain name server apparatus of claim 10 further comprising:

a plurality of domain name labels stored in memory, each domain name label having associated therewith a network protocol address, each domain name label representing area code data of a telephone number.

14. The domain name server apparatus of claim 10 further comprising:

a plurality of domain name labels stored in memory, each domain name label having associated therewith a network protocol address, each domain name label representing exchange number data of a telephone number.

15. A computer program product for use with a computer system, the computer system operatively coupled over a packet-switched data network to one or more executing tasks, the computer program product comprising a computer usable medium having program code embodied in the medium for enabling the translation of data representing the telephone number of subscriber apparatus on a circuit-switched network into a network protocol address, the telephone number comprising area code, exchange, and subscriber segments, each segment having a sequence of at least one number, the program code comprising:

program code for receiving a telephone number domain name from a source, the telephone number domain comprising the segments of a telephone number in reverse order but with the number sequence of each segment maintained;

program code responsive to at least a portion of the telephone number domain name for generating a network protocol address; and program code, responsive to the generated network protocol address, for forwarding the network protocol address to the source.

16. The computer program product of claim 15 wherein the program code for generating a network protocol address comprises:

program code for storing in the computer system, at least one domain name having associated therewith a network protocol address, the domain name representing at least one of the carrier, country code, area code, exchange, and subscriber number data of a telephone number.

17. The computer program product of claim 15 wherein the program code for generating a network protocol address comprises:

program code for storing in the computer system, a plurality of domain names, each having associated therewith a network protocol address, each of the domain names representing country code data of a telephone number.

18. The computer program product of claim 15 wherein the program code for generating a network protocol address comprises:

program code for storing in the computer system, a plurality of domain names, each having associated therewith a network protocol address, each of the domain names representing area code data of a telephone number.

19. The computer program product of claim 15 wherein the program code for generating a network protocol address comprises:

program code for storing in the computer system, a plurality of domain names, each having associated therewith a network protocol address, each of the domain names representing exchange data of a telephone number.

20. A system for facilitating communication between processes executing on a packet-switched communication network, the system comprising:

a domain name server operatively coupled to the packet-switched network, the domain name server comprising resolution logic configured to receive, from a source process, a telephone number domain name derived at least in part from a reordered portion of a telephone number, and configured to generate a network protocol address associated with at least a portion of the telephone number domain name, wherein the telephone number comprises a plurality of segments, and the reordered portion comprises the segments in a reverse order while maintaining the number sequence of each segment; and a gateway server, operatively coupled to the packet-switched data network and the circuit-switched communication network, the gateway server addressable by the network protocol address and comprising logic configured to initiate a communication link between subscriber apparatus on the circuit-switched communication network and the source process on the packet-switched data network.

21. The method of claim 1 wherein the telephone number comprises area code, exchange, and subscriber segments, each segment having a sequence of at least one number, and wherein the telephone number domain name comprises the segments of a telephone number in reverse order but with the number sequence of each segment maintained.

22. The apparatus of claim 10 wherein the telephone number comprises area code, exchange, and subscriber segments, each segment having a sequence of at least one number, and wherein the telephone number domain name comprises the segments of a telephone number in reverse order but with the number sequence of each segment maintained.

23. The system of claim 20 wherein the telephone number comprises area code, exchange, and subscriber segments, each segment having a sequence of at least one number, and wherein the telephone number domain name comprises the segments of a telephone number in reverse order but with the number sequence of each segment maintained.

* * * * *